United States Patent Office 3,449,463
Patented June 10, 1969

3,449,463
ISOMERIZATION OF ACYCLIC TRIENE COMPOUNDS
Joseph R. Kenton, Donald L. Crain, and Ernest A. Zuech, Bartlesville, Okla., assignors to Phillips Petroleum Company, a corporation of Delaware
No Drawing. Filed Dec. 19, 1966, Ser. No. 602,475
Int. Cl. C07c 5/24, 5/30
U.S. Cl. 260—677    2 Claims

ABSTRACT OF THE DISCLOSURE

Nonconjugated acyclic triene hydrocarbons containing 8 to 12 carbon atoms per molecule are isomerized to a conjugated form having the same number of atoms per molecule as before isomerization by contacting said compound with an activated magnesium oxide, wherein the weight range of magnesium oxide catalyst to the acyclic triene compound is generally within the range of .001:1 to 1:1.

---

This invention relates to the isomerization of acyclic triene compounds.

According to this invention, nonconjugated acyclic triene compounds are isomerized to move at least one double bond to a new position within the structure by contacting said compound with a magnesium oxide catalyst.

In this invention nonconjugated acyclic trienes containing 8 to 12 carbon atoms per molecule are isomerized to trienes wherein at least one double bond is positioned differently than prior to isomerization. In a preferred embodiment, trienes containing 8 carbon atoms are used. The trienes produced by the isomerization process of this invention have at least one double bond positioned differently after isomerization; however, it is fully within the scope of this invention to reorient either two or three double bonds. According to this invention, however, the total number of atoms per molecule and the total number of double bonds do not change in the isomerization process.

Accordingly, it is an object of this invention to provide a process for the isomerization of acyclic trienes.

Other objects, advantages and features of this invention will be readily apparent to those skilled in the art from the following description and appended claims.

The catalyst of the present invention comprises magnesium oxide. In one embodiment, the magnesium oxide was obtained by heating a compound containing magnesium which decomposed to produce a magnesium oxide. Minor amounts of other materials, such as silicon oxide or aluminum oxide, can be present as impurities without departing from the scope of the invention. In a specific embodiment, Brucite (magnesium hydroxide) was decomposed to magnesium oxide by heat. Depending upon the contacting technique to be used in this invention, which will be subsequently described, the magnesium oxide can be in the form of pellets, extrudates, agglomerates, or fine powder. According to this invention, the magnesium oxide is activated by heating in a stream of flowing air from 1 to 30 hours at a temperature of 500° F. to 1500° F., but preferably within the range of 650° F. to 1000° F.

The acyclic trienes, which are applicable for isomerization according to this invention, are nonconjugated acyclic trienes containing 8 to 12 carbon atoms per molecule. Trienes containing 8 carbon atoms per molecule are particularly applicable for use in this invention. Examples of acyclic trienes suitable for use in this invention include 1,3,7-octatriene, 1,3,6-octatriene, 3-methyl-1,4,6-heptatriene, 1,5,7-decatriene, and 2-methyl-5-ethyl-1,4,7-octatriene.

As has been previously recited, according to a preferred embodiment of this invention, only the location of the double bonds is altered by the isomerization process and little or no skeletal isomerization is effected. However, at elevated temperatures with certain specific trienes some cyclic isomerization products can be obtained.

In accordance with this invention, the acyclic triene is contacted with the magnesium oxide catalyst either in the gaseous or liquid phase using either a fixed or fluidized bed technique known by those learned in the art. Specifically, it is within the scope of this invention to effect the required triene-catalyst contact by suspending the magnesium oxide catalyst in the triene to be isomerized and agitating said mixture. According to this invention, the weight ratio of magnesium oxide catalyst to acyclic triene compound is within the range of about 0.001:1 to about 1:1.

Isomerization can be conducted at any convenient pressure. The temperature required for isomerization can be within the range of about 30° F. to 400° F. In one embodiment, a temperature of 212° F. was employed. The time required for isomerization under the aforementioned conditions can vary from about 1 second to about 20 hours. In one embodiment, 2½ hours was sufficient for isomerization. The isomerization can be conducted either continuously or batch-wise by methods known in the art and can be carried out in either the presence or absence of inert diluents.

At the completion of the isomerization, the reaction mixture can be subjected to conventional separation techniques to isolate the products desired. Specifically, fractional distillation, adsorption, and crystallization can be used.

Various modifications of the invention can be made in view of the foregoing disclosure and the appended claims without departing from the spirit or scope thereof.

The following examples will further illustrate the invention. However, it is to be understood they are for illustrative purposes only and must not be considered as limiting the invention.

EXAMPLE I

A 50 ml. buret was packed, under the nitrogen atmosphere, with 25 ml. of MgO and 15 ml. of activated silica gel. The MgO was a 50–100 mesh powder which had been activated in flowing air at 1000° F.

A 56.8 gram quantity of octatrienes (containing 41.5 percent 1,4,7-octatriene, 56.0 percent 1,3,6-octatriene, and 2.5 percent 4-vinylcyclohexane) was allowed to flow through the packed buret by gravity, first passing through the silica gel bed and then through the magnesium oxide bed. Though the catalyst bed and octatriene feed were originally at room temperature, the portion of the MgO bed which made first contact with the olefin feed was warmed by the reaction.

After passage through the packed buret, the effluent was analyzed and found to contain 30.1 percent 1,3,7-octatriene, 0.0 percent 1,3,6-octatriene, 2.1 percent 4-vinylcyclohexene, 65.9 percent 2,4,6-octatriene, and 1.7 percent unknown.

The effluent was then mixed with an additional 4 grams of the magnesium oxide catalyst and heated in a vessel with stirring, under nitrogen atmosphere, for about 2½ hours at about 212° F. The liquid was again analyzed and the results are shown in Table I, which also includes results of the preceding treatment.

TABLE I

|  | Starting material | After fixed-bed treatment | After additional heat treatment |
|---|---|---|---|
| 1,3,6-octatriene, percent | 56.0 | 0.0 | 0.0 |
| 1,3,7-octatriene, percent | 41.6 | 30.1 | 27.5 |
| 2,4,6-octatriene, percent | 0.0 | 65.9 | 68.2 |
| 4-vinylcyclohexene, percent | 2.5 | 2.1 | 2.5 |
| Unknown, percent | 0.0 | 1.7 | 1.9 |

The data in Table I indicate that the fixed-bed treatment was very effective in isomerizing the octatrienes, particularly the 1,3,6-octatriene to the 2,4,6- form.

EXAMPLE II

In a manner similar to that of Example I, a 25 ml. buret was packed, under nitrogen atmosphere, with 16 ml. of magnesium oxide (50–100 mesh material activated at 1000° F. in flowing air) and 9 ml. of silica gel. A 38 gram quantity of octatrienes was allowed to flow through the buret by gravity in about one hour. The liquid was then given additional heating in the presence of 5 grams of additional magnesium oxide in a flask with stirring. The mixture was heated at 212° F. to 244° F. for about 5 hours. The liquid product from these treatments was analyzed and the results are shown in Table II.

TABLE II

|  | Starting material | After fixed-bed treatment | After additional heat treatment |
|---|---|---|---|
| 1,3,6-octatriene, percent | 56.0 | 0.0 | 0.0 |
| 1,3,7-octatriene, percent | 41.6 | 30.0 | 27.1 |
| 2,4,6-octatriene, percent | 0.0 | 66.2 | 68.8 |
| 4-vinylcyclohexene, percent | 2.5 | 2.0 | 2.3 |
| Unknown, percent | 0.0 | 1.7 | 1.8 |

The data in Table II again show that a substantial isomerization took place by simply passing the octatriene feed through the fixed magnesia-containing bed. Additional isomerization took place upon additional heating.

EXAMPLE III

In this example, 3-methyl-1,4,6-heptatriene was isomerized by contact with activated magnesium oxide.

Under a nitrogen atmosphere, a 25 ml. buret was charged with 20 ml. of similarly activated MgO and 5 ml. of silica gel. A 16.6 gram quantity of 3-methyl-1,4,6-heptatriene was then percolated through the fixed-bed. The bed, at the point of initial contact of the polyene with the MgO, became hot to the touch and was estimated to be at a temperature of about 176° F. to 256° F.

The analysis of the effluent from this bed showed that all of the methylheptatriene had been converted. The major component was analyzed by infrared and its spectrum was found to be nearly identical with that of 3-methyl-1,3,5-heptatriene. The test showed, therefore, that a branched octatriene is also easily isomerized by the process of the present invention.

What is claimed is:

1. A process of isomerizing a nonconjugated acyclic triene hydrocarbon containing 8 to 12 carbon atoms per molecule to a conjugated acyclic triene hydrocarbon having the same number of atoms per molecule as before isomerization, comprising contacting in an isomerization zone said acyclic triene hydrocarbon with a catalyst comprising magnesium oxide so as to effect said isomerization; wherein said acyclic triene hydrocarbon is contacted with magnesium oxide in the temperature range of from about 30° F. to about 400° F. for a period of time within the range of 1 second to about 20 hours.

2. The process of claim 1 wherein said acyclic triene compound prior to isomerization is selected from the group consisting of 1,3,6-octatriene, 1,3,7-octatriene, and 3-methyl-1,4,6-heptatriene; wherein said 1,3,6-octatriene and 1,3,7-octatriene is isomerized to 2,4,6-octatriene and said 3-methyl-1,4,6-heptatriene is isomerized to 3-methyl-1,3,5-heptatriene and 3-methyl-2,4,6-heptatriene; wherein said acyclic triene compound to be contacted with said magnesium oxide is in either the vapor or liquid phase; wherein the weight ratio of magnesium oxide catalyst to the acyclic triene compound is within the range of .001:1 to 1:1; wherein said magnesium oxide catalyst consists essentially of magnesium oxide activated for isomerization by the steps of heating in a heating zone a magnesium compound that will decompose to form magnesium oxide for a length of time within the range of 1 to 30 hours at a temperature within the range of 500° F. to 1500° F.; and passing a stream of air through said heating zone during said length of time and removing from said heating zone during said length of time, water, $CO_2$, and free oxygen so as to produce a residue of magnesium oxide active for isomerization.

References Cited

UNITED STATES PATENTS 2,361,613  10/1944  Drennan _____ 260—683.2

DELBERT E. GANTY, *Primary Examiner.*

J. D. MYERS, *Assistant Examiner.*

U.S. Cl. X.R.

260—683.2